United States Patent [19]
Bohne et al.

[11] Patent Number: 6,032,412
[45] Date of Patent: Mar. 7, 2000

[54] MOULDED BODIES COMPRISING OF HUMUS-CONTAINING PLANT SUBSTRATE CONSOLIDATED WITH POLYURETHANE/POLYUREA, A PROCESS FOR PRODUCING THEM AND THEIR USE IN PLANT CULTIVATION

[75] Inventors: Franz-Josef Bohne, Leichlingen; Martin Brahm, Leverkusen, both of Germany; Alberto Carlos Gonzalez-Dörner, Bassano del Grappa, Italy; Marc Herrmann, Leichlingen, Germany; Manfred Schmidt, Dormagen, Germany; Franz-Josef Giesen, Rommerskirchen, Germany; Manfred Teichmann, Cologne, Germany

[73] Assignees: Bayer Aktiengesellschaft, Leverkusen; Ernst Sonderhoff GmbH & Co. KG, Cologne, both of Germany

[21] Appl. No.: 09/077,130

[22] PCT Filed: Nov. 14, 1996

[86] PCT No.: PCT/EP96/04981

§ 371 Date: May 22, 1998

§ 102(e) Date: May 22, 1998

[87] PCT Pub. No.: WO97/19585

PCT Pub. Date: Jun. 5, 1997

[30] Foreign Application Priority Data

Nov. 27, 1995 [DE] Germany ........................ 195 44 108

[51] Int. Cl.[7] .......................... A01G 31/02; A01B 79/00; A01C 1/00; C08K 3/00

[52] U.S. Cl. .................. 47/58.1; 47/65.5; 47/65.7; 521/15; 524/3

[58] Field of Search .................. 47/58.1, 65.5, 47/65.7; 521/159, 15; 524/379, 3; 564/503

[56] References Cited

U.S. PATENT DOCUMENTS

| | | | |
|---|---|---|---|
| 3,805,532 | 4/1974 | Kistner | 47/58 |
| 4,034,508 | 7/1977 | Dedolph | 47/58 |
| 4,045,527 | 8/1977 | Babayan et al. | 521/167 |
| 4,609,685 | 9/1986 | Cuscurida et al. | 521/167 |

FOREIGN PATENT DOCUMENTS

| | | | |
|---|---|---|---|
| 3829256 | 11/1991 | Germany | 47/58 |
| 1318736 | 5/1973 | United Kingdom | 47/58 |

*Primary Examiner*—David T. Fox
*Assistant Examiner*—Anne Marie Grünberg
*Attorney, Agent, or Firm*—Joseph C. Gil; Lyndanne M. Whalen

[57] ABSTRACT

Moulded bodies are described which comprise a humus-containing plant substrate consolidated with polyurethane/polyurea, which are obtainable by slurrying a humus-containing plant substrate in water, admixing a liquid NCO prepolymer having a maximum NCO content of 15% by weight which has been produced by the reaction of toluene diisocyanate with a polyether polyol component containing at least one aminopolyether polyol in an amount of 0.5 to 100 mole % with respect to the polyol component, and introducing the mixture thus obtained into a mould and allowing it to solidify. A process for producing these moulded bodies is also described, as is their use as growth media for seedlings in the propagation and raising of plants.

7 Claims, No Drawings

MOULDED BODIES COMPRISING OF HUMUS-CONTAINING PLANT SUBSTRATE CONSOLIDATED WITH POLYURETHANE/POLYUREA, A PROCESS FOR PRODUCING THEM AND THEIR USE IN PLANT CULTIVATION

FIELD OF THE INVENTION

This invention relates to moulded bodies for the propagation and raising of plant seedlings, wherein the moulded body consists of a humus-containing plant substrate consolidated with polyurethane/polyurea. The invention also relates to a process for producing moulded bodies of this type and to their use as nutrient media in the propagation and raising of plants.

Plant propagation (sowing of seeds and propagation of cuttings) and the raising of plants (continued cultivation of plants which have developed into seedlings) are traditionally carried out in plant soils which usually consist, depending on the type of plants, of mixtures of peat, sand, garden soil and composts, moss- and bark-based soils, or so-called ready-to-use soils to which granular plastics are often added as auxiliary agents for breaking up the soil. In commercial nurseries, moulded bodies which consist of plant substrates consolidated with polyurethane plastics are used for the propagation and raising of plants. These substrate bodies contain the plant seedling and can be pricked out or cut with the plant during propagation, or the seedlings can be cultivated directly on moulded bodies which have been cut previously. Moulded bodies comprising peat and nutrients and which have been consolidated by means of a polyurethane are already known from DE-OS 1 949 462. Production installations are known from DE 3 829 256 in which a peat-water mixture is mixed, batch-wise or continuously, with a hydrophilic polyurethane prepolymer and is shaped in a mould, with curing of the plastic, to form corresponding moulded bodies or so-called peat plugs. The polyurethane polymers which are currently used to produce the moulded bodies employed in plant cultivation still have some disadvantages in this field of application, such as insufficient reactivity in the peat-water mixture, a high sensitivity to temperature, a high dependency on the neutral pH range, a high sensitivity as regards disturbances of their reactivity, caused by natural variations in the composition of the substrate, a high usage of the polymer plastic constituent, a complex construction of the production installation.

The object of the present invention was therefore to find a polyurethane plastic with which moulded bodies containing a plant substrate for the propagation and raising of plants could be produced without the aforementioned disadvantages.

It has now been found that moulded bodies which contain plant substrate and which are consolidated with a polyurethane plastic can be produced without the said disadvantages if prepolymers from the reaction of toluene diisocyanate (hereinafter called TDI) with a polyol component containing at least one aminopolyether polyol are used for consolidating the moulded bodies.

SUMMARY OF THE INVENTION

The present invention thus relates to moulded bodies comprising a humus-containing plant substrate consolidated with polyurethane/polyurea, which are obtained by a) slurrying a humus-containing plant substrate in water,
b) admixing a liquid NCO prepolymer having a maximum NCO content of 15% by weight, produced by the reaction of TDI with a polyether polyol component containing at least one aminopolyether polyol in an amount of 0.5 to 100 mole % with respect to the polyether polyol component, and
c) introducing the mixture thus obtained into a mould and allowing it to solidify.

The moulded bodies according to the invention may contain all the plant substrates which are customary in plant cultivation, such as peat, sand/soil mixtures, potting compost, sewage sludge, compost or granular bark materials, and preferably contain peat, potting compost, sewage sludge and/or compost.

The moulded bodies according to the invention preferably contain the NCO prepolymer in an amount of 5 to 20% by weight with respect to the humus-containing plant substrate.

The polyether polyol component should preferably have a functionality of 2 to 6, an average molecular weight in the range from 250 to 12,000, particularly from 350 to 6000.

The polyether polyol component always contains at least one polyether which contains an amino-group. This is understood to mean a polyether which is started on an aminoalcohol or on a polyamine (e.g. on triethanolamine or ethylenediamine).

The polyether polyol component may contain aminopolyethers which comprise propyleneoxy or ethyleneoxy groups, and which are started on triethanolamine or ethylenediamine, for example.

Apart from one aminopolyether polyol, a plurality of aminopolyether polyols may also of course be present in the polyol component. The proportion of aminopolyether polyol is advisedly 0.5 to 100 mole %, preferably 2 to 20 mole %, with respect to the polyether polyol component.

In addition to the at least one aminopolyether polyol, other polyether polyols may also be present in the polyol component. Examples thereof include polyethers with molecular weights from 250 to 12,000 and functionalities of 2 to 6, particularly polyesters with molecular weights from 350 to 1000.

The polyol component may also contain customary auxiliary materials and additives, such as activators, emulsifiers and/or stabilisers, for example.

TDI, e.g. 2,4- and 2,6-TDI and any mixtures of these isomers, is used as the isocyanate component. Modified TDI can also be used, e.g. TDI modified by carbodiimide groups, urethane groups, allophanate groups, isocyanurate groups, urea groups or biuret groups.

The TDI is preferably used as a mixture of the 2,4- and 2,6-isomers in a ratio of 80:20 (T80).

The maximum NCO content of the prepolymer obtained by the reaction of TDI with the polyol component is 15% by weight, e.g. 5 to 15% by weight, preferably 3 to 10% by weight, with respect to the amount of TDI and polyol used.

In addition to the humus-containing plant substrate, the moulded bodies according to the invention may also, depending on the type of plants and the period of growth, contain additives, such as nutrient substances, growth regulators, buffering substances, pest control and protection media, mineral salts and trace elements, as well as all the fertilisers which are necessary for the growth of the plants, for example. The moulded bodies according to the invention may also contain agents which are known in the art for bringing forward the period of cultivation and shortening the duration of growth.

The present invention also relates to a process for producing moulded bodies comprising a humus-containing plant substrate consolidated with polyurethane/polyurea, in which a) a humus-containing plant substrate is slurried in water,
b) a liquid NCO prepolymer is admixed, which has a maximum NCO content of 15% by weight, and which is produced by the reaction of TDI with a polyether polyol component containing at least one aminopolyether polyol in an amount of 0.5 to 100 mole % with respect to the polyether polyol component, and
c) the mixture thus obtained is introduced into a mould and allowed to solidify.

In addition to the humus-containing plant substrate, one or more additives may also optionally be introduced in solid or liquid form into the mixture, such as nutrient substances, growth regulators, buffer substances, pest control and protection media, mineral salts and trace elements, as well as all the fertilisers which are necessary for the growth of the plants, for example.

The process according to the invention can be carried out in all previously known continuously operated production installations for the production of moulded bodies for plant cultivation (peat plugs). These previous production installations can advantageously be simplified and their space requirement reduced, however, so that production installations for carrying out the process according to the invention can accordingly be operated considerably more economically. The simplification when carrying out the process according to the invention consists of the discontinuation of measures such as the restricted use of the humus-containing substrate and the monitoring of temperature and pH, and of the shortening of moving belts due to the more rapid solidification of the NCO prepolymer used according to the invention compared with the PUR polymers used previously. Apart from a reduction in cost for the production of the moulded bodies, a higher productivity can thus advantageously be achieved also.

In this respect, the continuous process for the consolidation of humus-containing plant substrates, particularly for the consolidation of peat, is advantageously carried out as follows: in a production installation known in the art for producing peat plugs, the slurried water-peat mixture is introduced from a supply vessel into a mixing and proportioning device in which 5 to 20% by weight of the polyurethane prepolymer is added to the mixture and homogenised. The paste of peat-water-plastic material is moulded to form a strip-shaped moulded body (e.g. 120 cm wide, 10 cm high). Curing of the added prepolymer sets in even during this moulding operation to form a strip-shaped moulded body, so that in a further process step dimensionally stable holes, which serve subsequently to receive the plant cutting in the nursery, can be pressed in from below. Shaping bodies for delimiting the individual peat parts (peat plugs) are pressed in from above in the manner known in the art. The material subsequently travels over a conveyor belt where the final polymerisation of the polyurethane-polyurea assists the expulsion of water. The water-containing moulded body is adjusted to the desired water content in a centrifuge. The moulded bodies are subsequently cut to size and into the desired shape and are packed for transport to commercial nurseries.

In addition to the process known in the art for the continuous production of peat plugs, the moulded bodies according to the invention can also be produced batch-wise. Plant seedlings inserted in the moulded bodies according to the invention can be planted in the soil together with the moulded body, wherein the roots of the seedling can grow into the surrounding soil unimpeded by the moulded body, so that plants of any desired size, even trees, can be planted out with the aid of the moulded bodies according to the invention. As regards the requirements for the growth needs of the plants, the moulded bodies according to the invention exhibit the following significant advantages:

good permeability to air, for the optimum aeration of the substrates.

a good, well balanced water storage capacity for a durable supply of water to the plants.

good flushing capacity for the drainage of surplus amounts of water and for intermittent flushing to prevent premature mineralisation of the substrates when adding fertilisers.

good diffusivity and water absorbency, so as, for waterborne cultures in particular, to ensure the transport of water from the groundwater of the water-borne culture into the aerated root space, for a uniform and continuous supply of water.

favourable thermal compensating properties of the substrates, for optimum growth and for protection from damage (particularly for cultures on open land) if there is a short-term penetration of frost or if the soil heats up too strongly.

The present invention further relates to the use of the moulded bodies described above as growth media for seedlings in the propagation and raising of plants. Apart from the cultivation of ornamental plants, the moulded bodies according to the invention can also be used in the cultivation of trees, in tree nurseries, in vine propagation, in the forestry trade for the propagation of conifers, for the consolidation of dunes and slopes, and for the reafforestation of karst areas. The moulded bodies according to the invention may also advantageously be used for the planting of balconies and for house plants.

The following examples explain the invention in more detail, without restricting the scope of the invention, however.

DETAILED DESCRIPTION OF THE INVENTION

EXAMPLES

Example 1
Production of an NCO Prepolymer 348.32 kg toluene diisocyanate (a mixture of 80% by weight of the 2,4- and 20% by weight of the 2,6-isomer) were added to 608.90 kg of a polyether mixture consisting of a mixture of 12 moles of a linear polyether with an OH number of 185 (molecular weight: 606) and 1 mole of a trifunctional polyether, which was started on triethanolamine and which had an OH number of 150 (molecular weight: 1122), and stirred for 2 hours at 60° C.

A prepolymer was thus obtained which was characterised by the following analytical data:

NCO content: 8.06% by weight viscosity (25° C.): 22,100 mPas

Example 2
Production of a Moulded Body According to the Invention

The moulded bodies according to the invention were produced in a production installation known in the art for the continuous production of so-called peat plugs. A production installation of this type is described in DE 3 829 256, for example.

The water-peat mixture was fed from a supply vessel into a mixing and proportioning installation, in which 5% by weight of the NCO prepolymer from example 1 was added to the mixture and homogenised. Shaping of the paste of peat-water-plastic material into a body of width 120 cm and height 10 cm occurred during its passage through a longitudinal hopper. The solidification reaction set in even at this stage. Dimensionally stable holes, which would serve subsequently to receive the plant cutting in the nursery, were pressed in from below. Shaping bodies for delimiting the individual peat parts, the so-called peat plugs, were pressed in from above. The material travelled over a conveyor belt where the reaction of the plastic material promoted the expulsion of water. The peat-water-plastic material moulded body was adjusted to the desired water content in a centrifuge. The peat plugs were subsequently cut to size and packed for transport to commercial nurseries.

Example 3

Production of a moulded body according to Example 2, wherein 20% by weight of the NCO prepolymer from Example 1 was added to the water/peat mixture and homogenised.

We claim:

1. A moulded body comprising a humus-containing plant substrate consolidated with amino group-containing polyurethane/polyurea, obtained by
   a) slurrying a humus-containing plant substrate in water,
   b) admixing a liquid NCO prepolymer having a maximum NCO content of 15% by weight, produced by reaction of toluene diisocyanate with a polyether polyol component containing at least one aminopolyether polyol in an amount of 0.5 to 100 mole % with respect to the polyether polyol component, and
   c) introducing the mixture thus obtained into a mould and allowing it to solidify.

2. The moulded body according to claim 1, wherein the polyether polyol component has a functionality of 2 to 6 and an average molecular weight in the range from 250 to 12,000.

3. The moulded body according to claim 1, wherein the amount of prepolymer is 5 to 205 by weight with respect to the humus-containing plant substrate.

4. The moulded body according to claim 1, wherein peat, potting compost, sewage sludge and/or compost is slurried as the humus-containing plant substrate.

5. A process for producing a moulded body comprising a humus-containing plant substrate consolidated with amino group-containing polyurethane/polyurea, wherein
   a) a humus-containing plant substrate is slurried in water,
   b) a liquid NCO prepolymer is admixed, which has a maximum NCO content of 15% by weight, and which is produced by the reaction of toluene diisocyanate with a polyether polyol component containing at least one aminopolyether polyol in an amount of 0.5 to 100 mole % with respect to the polyether polyol component, and
   c) the mixture thus obtained is introduced into a mould and allowed to solidify.

6. A process for producing a moulded body according to claim 5, wherein, in addition to the humus-containing plant substrate, one or more additives selected from the group consisting of nutrient substances, growth regulators, buffer substances, pest control and protection media, mineral salts, trace elements, and fertilisers, are introduced into the mixture.

7. A growth medium for seedlings in the propagation and raising of plants comprising the molded body of claim 1.

* * * * *